(12) United States Patent
Dong et al.

(10) Patent No.: US 12,347,617 B2
(45) Date of Patent: Jul. 1, 2025

(54) ELECTROCHEMICAL ENERGY STORAGE DEVICE

(71) Applicant: AVX New Energy (Chengdu) Co., Ltd, Sichuan (CN)

(72) Inventors: Guangyong Dong, Sichuan (CN); Dezhong Chen, Sichuan (CN); Junqiang Luo, Sichuan (CN); Jie Xiang, Sichuan (CN); Fanghui Zhao, Sichuan (CN)

(73) Assignee: KYOCERA AVX Components (Chengdu) Co., Ltd., Chengdu (CN)

( * ) Notice: Subject to any disclaimer, the term of this patent is extended or adjusted under 35 U.S.C. 154(b) by 288 days.

(21) Appl. No.: 17/618,535

(22) PCT Filed: Jun. 8, 2020

(86) PCT No.: PCT/CN2020/094911
§ 371 (c)(1),
(2) Date: Jun. 23, 2022

(87) PCT Pub. No.: WO2020/248936
PCT Pub. Date: Dec. 17, 2020

(65) Prior Publication Data
US 2022/0344107 A1    Oct. 27, 2022

(30) Foreign Application Priority Data
Jun. 11, 2019  (CN) .......................... 201910502339.4

(51) Int. Cl.
*H01G 11/80*  (2013.01)
*H01G 11/14*  (2013.01)
*H01G 11/74*  (2013.01)

(52) U.S. Cl.
CPC ............. *H01G 11/80* (2013.01); *H01G 11/14* (2013.01); *H01G 11/74* (2013.01)

(58) Field of Classification Search
CPC ........ H01G 11/82; H01G 11/14; H01G 11/80; H01G 11/74
See application file for complete search history.

(56) References Cited

U.S. PATENT DOCUMENTS

| 2,144,959 | A | * | 1/1939 | Blackburn | ............... | H01G 9/10 |
| | | | | | | 429/174 |
| 2,225,801 | A | * | 12/1940 | Schnoll | .................... | H05K 7/12 |
| | | | | | | 29/25.03 |

(Continued)

FOREIGN PATENT DOCUMENTS

| CN | 202887989 | 4/2013 |
| CN | 103700511 | 4/2014 |

(Continued)

OTHER PUBLICATIONS

International Search Report for PCT/CN2020/094911 mailed Aug. 28, 2020, 3 pages.

(Continued)

*Primary Examiner* — David M Sinclair
(74) *Attorney, Agent, or Firm* — Dority & Manning, P.A.

(57) ABSTRACT

An electrochemical energy storage device, which relates to the technical field of electrochemical energy storage devices. The device comprises: an upper connecting bar (4), a rubber piece (3) that has an insulating and sealing effect, a housing (7) and a rolled core (5); the housing (7) is cylindrical and is provided with an opening at at least one end, and the rubber piece (3) and the housing (7) are sealedly connected by means of a waisted section (9) provided on the housing (7); the rolled core (5) is provided in an inner cavity of the housing (7); one end of the upper connecting bar (4) penetrates the rubber piece (3) so as to be conductively connected to a negative electrode welding piece (1), while the other end of the upper connecting bar (4) is conductively connected to the rolled core (5); the rolled core (5) is (Continued)

conductively connected to the housing (7) by means of a lower connecting piece (6); and a positive electrode welding piece (8) is conductively connected to the housing (7). The rubber piece (3) features a good insulation effect, a simple structure and low cost. The upper connecting bar (4) and the lower connecting piece (6) are used for welding, and thus internal resistance is low and large current charging and discharging may be achieved.

11 Claims, 6 Drawing Sheets

(56) References Cited

U.S. PATENT DOCUMENTS

| | | | | |
|---|---|---|---|---|
| 2,569,925 | A | * | 10/1951 | McKnight ............... H01L 23/48 |
| | | | | 174/50.56 |
| 3,197,547 | A | * | 7/1965 | Peace, Jr. ................. H01G 9/12 |
| | | | | 174/521 |
| 4,513,873 | A | * | 4/1985 | Klaschka ............... H01G 4/224 |
| | | | | 220/203.08 |
| 4,663,824 | A | * | 5/1987 | Kenmochi ............... H01G 9/06 |
| | | | | 29/25.03 |
| 5,245,513 | A | * | 9/1993 | Maijers .................... H01G 9/10 |
| | | | | 361/520 |
| 9,287,059 | B2 | | 3/2016 | Miura et al. |
| 10,957,492 | B2 | | 3/2021 | Will et al. |
| 11,532,441 | B2 | * | 12/2022 | Hansen |
| 2002/0187393 | A1 | * | 12/2002 | Ananthanarayanan ...................... |
| | | | | H01M 50/172 |
| | | | | 429/178 |
| 2006/0098383 | A1 | * | 5/2006 | Goesmann ............. H01G 11/10 |
| | | | | 361/272 |
| 2006/0156521 | A1 | * | 7/2006 | Miura .................... H01G 9/008 |
| | | | | 29/25.03 |

| | | | |
|---|---|---|---|
| 2009/0087733 | A1 | 4/2009 | Yoon et al. |
| 2016/0343997 | A1 | 11/2016 | Sekiya et al. |
| 2020/0035959 | A1 | 1/2020 | Yang et al. |

FOREIGN PATENT DOCUMENTS

| | | | |
|---|---|---|---|
| CN | 203746672 | | 7/2014 |
| CN | 106920703 | | 7/2017 |
| CN | 206657741 | | 11/2017 |
| CN | 207165430 | | 3/2018 |
| CN | 207852494 | | 9/2018 |
| CN | 108682568 | | 10/2018 |
| CN | 110136995 | | 8/2019 |
| CN | 209947672 | | 1/2020 |
| CN | 209947673 U | | 1/2020 |
| CN | 209947675 | | 1/2020 |
| JP | S5737236 U | | 2/1982 |
| JP | H10275751 | | 10/1998 |
| JP | 2000208378 | | 7/2000 |
| JP | 2000243670 | | 9/2000 |
| JP | 2000269099 A | * | 9/2000 |
| JP | 2002100342 | | 4/2002 |
| JP | 2002216716 | | 8/2002 |
| JP | 2004311831 A | | 11/2004 |
| JP | 2014209526 | | 11/2014 |
| KR | 20060027270 A | * | 3/2006 |
| KR | 20180021952 | | 3/2018 |
| KR | 20180021952 A | * | 3/2018 |
| WO | WO2005076296 | | 8/2005 |

OTHER PUBLICATIONS

EESR for EP Patent Application No. 20823661.2 dated Jun. 9, 2023, 8 pages.
Chinese Search Report for CN 2019105023394, 2 pages.

* cited by examiner

ELECTROCHEMICAL ENERGY STORAGE DEVICE

TECHNICAL FIELD

The present invention relates to the technical field of electrochemical energy storage devices, and in particular to an electrochemical energy storage device.

BACKGROUND OF THE INVENTION

Supercapacitors, also known as electrochemical capacitors, are electrochemical devices that store energy through polarized electrolytes. Thanks to their high power density, short charging time, and long service life, more and more importance has been placed on these capacitors as auxiliary energy sources in the storage systems of electric vehicles and smart grids. A capacitor structured with both the positive electrode and the negative electrode on the same side of the housing is called a radial capacitor, which has the shortcomings of high internal resistance, poor discharge capacity, and high heat generation. The problem with internal resistance is usually solved by an axial configuration. A supercapacitor with the leads at two ends has a much lower internal resistance than a radial capacitor, and may have a higher discharging current, thereby improving the power performance of the supercapacitor.

At present, aluminum cover plates are generally used for the electrodes of axial capacitors, and the housing is also made of aluminum. The cover plates and the housing have to be sealedly connected, and an insulation pad has to be provided between them, but there is still the risk of conduction between the cover plates and the housing, which will cause failure of the entire capacitor. Moreover, the aluminum cover plate is complex in structure and expensive.

BRIEF SUMMARY OF THE INVENTION

The purpose of the present invention is to provide an electrochemical energy storage device. The rubber piece features a good insulating effect, simple structure and low cost. The present invention uses an upper connecting bar and a lower connecting piece for welding, thus providing a low internal resistance for high current charging and discharging.

To achieve the above purpose, the present invention adopts the following technical solution:

an electrochemical energy storage device, comprising: an upper connecting bar, a rubber piece that has an insulating and sealing effect, a housing and a rolled core; wherein the housing is cylindrical and is provided with an opening at at least one end, and the rubber piece and the housing are sealedly connected by means of a waisted section provided on the housing; the rolled core is provided in an inner cavity of the housing; one end of the upper connecting bar penetrates the rubber piece and is conductively connected to a negative electrode welding piece, while the other end of the upper connecting bar is conductively connected to the rolled core; the rolled core is conductively connected to the housing by means of a lower connecting piece; and a positive electrode welding piece is conductively connected to the housing.

Further, the upper connecting bar is made of aluminum and comprises a bottom surface used for welding to the rolled core, a cylinder provided on one side of the bottom surface, and a positioning bar provided on the other side of the bottom surface and used for positioning with the central hole of the rolled core. The rubber piece is provided with a first through hole, and the rubber piece is sleeved on the cylinder of the upper connecting bar by means of the first through hole. The diameter of the bottom surface of the upper connecting bar is smaller than the inner diameter of the waisted section of the housing.

Further, a bakelite plate is fixedly connected to one side of the rubber piece, and a second through hole is provided at the center of the bakelite plate, which penetrates the plate and corresponds to the first through hole. The first through hole and the second through hole have the same diameter. The addition of a bakelite plate to the rubber piece is to increase the strength of the rubber piece so that it seals better.

Further, a fixing piece is provided between the upper connecting bar and the negative electrode welding piece. A third through hole penetrates the fixing piece at its center, the cylinder of the upper connecting bar goes through the third through hole and is fixed to the edge of the third through hole by welding, and the negative electrode welding piece is conductively connected to the fixing piece.

Further, the negative electrode welding piece and the positive electrode welding piece are both made of aluminum and plated with nickel or tin. They can be welded to a circuit board and are easy to use.

Further, the lower connecting piece is made of aluminum and is welded to the rolled core. A positioning hole protrudes from the center of the lower connecting piece and is inserted in the central hole of the rolled core.

Further, a first anti-explosion valve is provided at the center of the bottom of the housing, and a second anti-explosion valve is provided on the side wall of the housing.

Further, the first anti-explosion valve is a first groove formed on the side wall at the end of the housing, and the thickness of the first groove is smaller than that of the side wall at the end of the housing; the second anti-explosion valve is a second groove formed on the side wall of the housing, and the thickness of the second groove is smaller than that of the side wall of the housing.

Further, the positive electrode welding piece is provided with a third through hole that penetrates it, and the diameter of the third through hole is greater than the outer diameter of the first anti-explosion valve. This ensures that the anti-explosion valve can be opened normally within the set pressure range.

Further, the rubber piece is made of butyl rubber or ethylene-propylene-diene monomer rubber. The cost is lower than that of cover plates made of aluminum.

Compared with the prior art, the present invention has the following benefits:

1. The present invention provides an electrochemical energy storage device, which is an axial electrochemical energy storage device. An upper connecting bar and a lower connecting piece are used for welding, making the internal resistance low for high current charging and discharging; and a positive electrode welding piece and a negative electrode welding piece are used for welding the present invention to a circuit board.

2. The upper connecting bar is welded to a fixing piece to improve the strength of the rubber piece so that the rubber piece will not deform during use. A bakelite plate is provided on the surface of the rubber piece to increase its strength and prevent deformation. Compared with conventional needle-type products, the risk of liquid leakage is lower; at the same time, the structural rubber piece provided by the present invention is significantly less expensive than conventional aluminum cover plates.

Figure 1:
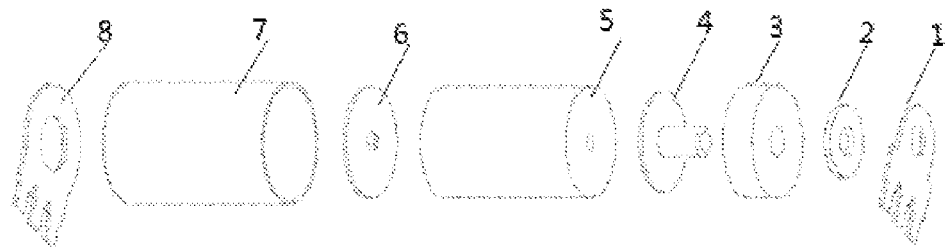
FIG. 1 is an exploded structural diagram of an electrochemical energy storage device of the present invention.

Reference numerals in the drawings: 1—negative electrode welding piece, 2—fixing piece, 3—rubber piece, 4—upper connecting bar, 5—rolled core, 6—lower connecting piece, 7—housing, 8—positive electrode welding piece, 9—waisted section, 31—bakelite plate, 41—cylinder, 42—bottom surface, 43—positioning bar, 51—central hole of the rolled core, 61—positioning hole.

DETAILED DESCRIPTION OF THE EMBODIMENTS

The present invention will be further described below in conjunction with the embodiments. The described embodiments are only some of the embodiments of the present invention, but not all the embodiments. Based on the embodiments of the present invention, all other embodiments obtained by those ordinarily skilled in the art without inventive work shall fall within the scope of the present invention.

Embodiment 1

Figure 2:
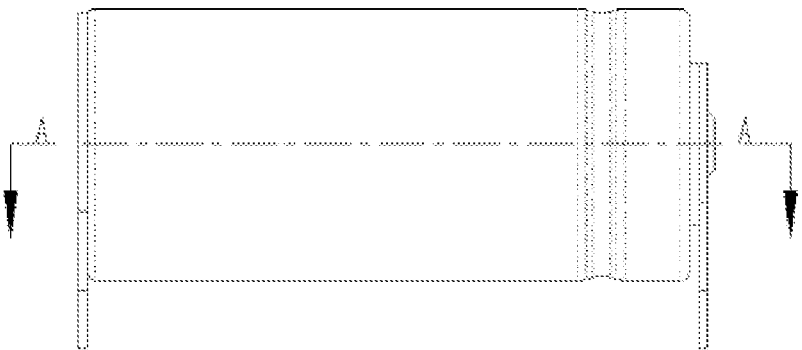
FIG. 2 is a schematic structural diagram of an electrochemical energy storage device of the present invention after assembling.
Figure 3:
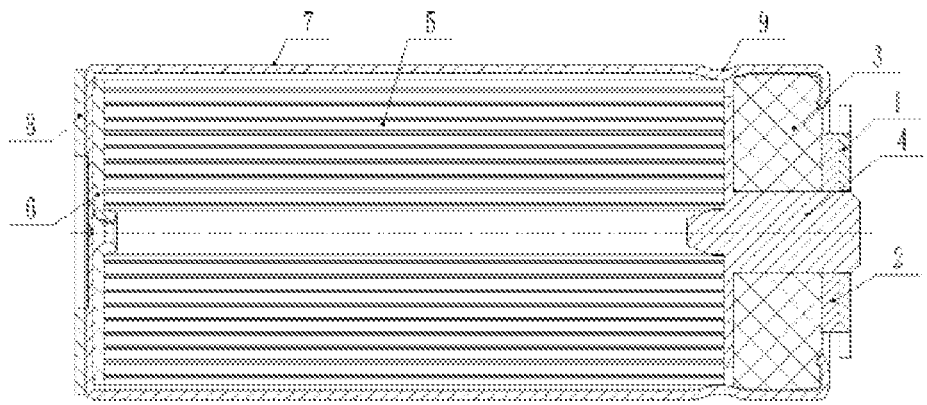
FIG. 3 is an A_A section view of FIG. 2.

As shown in FIGS. 1 to 3, an electrochemical energy storage device, comprising: an upper connecting bar 4, a rubber piece 3 that has an insulating and sealing effect, a housing 7 and a rolled core 5; wherein the housing 7 is cylindrical and is provided with an opening at at least one end, and the rubber piece 3 and the housing 7 are sealedly connected by means of a waisted section 9 provided on the housing 7; the rolled core 5 is provided in an inner cavity of the housing 7; one end of the upper connecting bar 4 penetrates the rubber piece 3 and is conductively connected to a negative electrode welding piece 1, while the other end of the upper connecting bar 4 is conductively connected to the rolled core 5; the rolled core 5 is conductively connected to the housing 7 by means of a lower connecting piece 6; and a positive electrode welding piece 8 is through-welded to the housing 7 for a conductive connection, and further, the positive electrode welding piece 8 is conductively connected to the positive electrode of the rolled core 5 through the housing 7 and the lower connecting piece 6. The negative electrode welding piece 1 and the positive electrode welding piece 8 are both made of aluminum and plated with nickel or tin. They can be welded to a circuit board and are easy to use. In this embodiment, the rubber piece 3 is made of butyl rubber or ethylene-propylene-diene monomer rubber. The cost is lower than that of cover plates made of aluminum.

Figure 5:
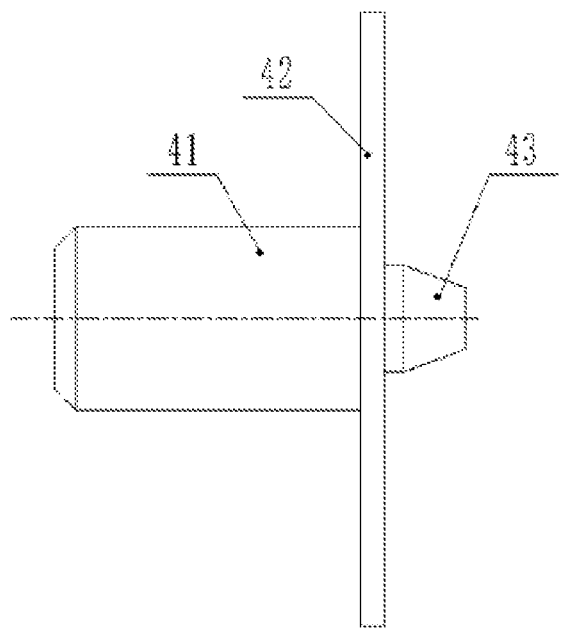
FIG. 5 is a schematic structural diagram of the upper connecting bar of an electrochemical energy storage device of the present invention.
Figure 11:
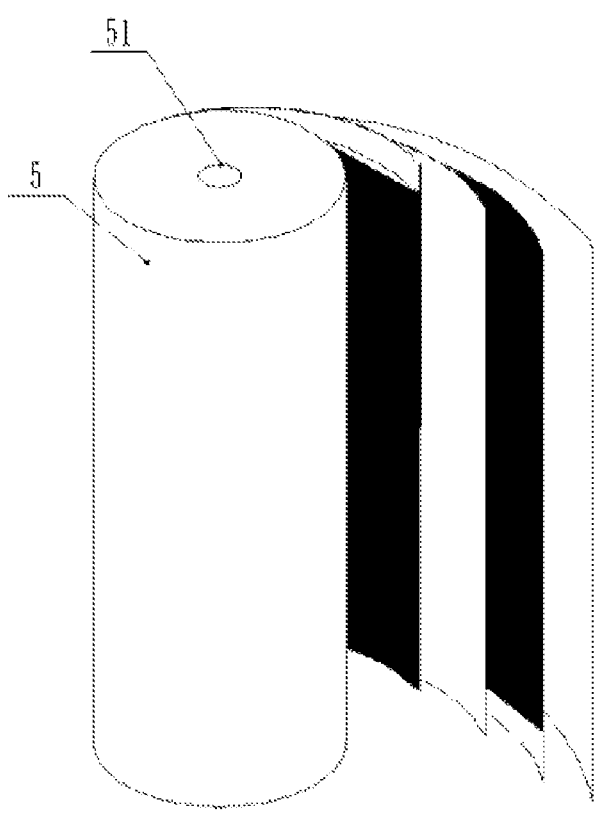
FIG. 11 is a schematic structural diagram of the rolled core of an electrochemical energy storage device of the present invention.

As shown in FIGS. 5 and 11, in this embodiment, the upper connecting bar 4 is made of aluminum. The upper connecting bar 4 comprises a bottom surface 42 welded to the rolled core 5, a cylinder 41 provided on one side of the bottom surface 42, and a positioning bar 43 provided on the other side of the bottom surface 42 and used for positioning with the central hole of the rolled core 5. The diameter of the positioning bar 43 is slightly smaller than that of the central hole of the rolled core 5, and can be placed in the central hole of the rolled core 5 for positioning. The bottom surface 42 may be conductively connected to the rolled core 5 by welding. The rubber piece 3 is provided with a first through hole, and the rubber piece 3 is sleeved on the cylinder 41 of the upper connecting bar 4 by means of the first through hole. The diameter of the bottom surface 42 of the upper connecting bar 4 is smaller than the inner diameter of the waisted section 9 of the housing 7.

More specifically, a fixing piece 2 is provided between the upper connecting bar 4 and the negative electrode welding piece 1. A third through hole penetrates the fixing piece 2 at its center, and the cylinder 41 of the upper connecting bar 4 goes through the third through hole and is fixed to the edge of the third through hole by welding. The negative electrode welding piece 1 is through-welded to the fixing piece 2 for a conductive connection with the upper connecting bar 4, and further, the negative electrode welding piece 1 is conductively connected to the rolled core 5 through the fixing piece 2 and the upper connecting bar 4.

The electrochemical energy storage device comprises structures such as the rubber piece 3, the housing 7, the roller core 5, etc. The rubber piece 3 fits the housing 7 and is located on its outside, and the rolled core 5 is located in the cavity formed between the housing 7 and the rubber piece 3. The first through hole of the rubber piece 3 protrudes from the upper connecting bar 4, the cylinder 41 of the upper connecting bar 4 penetrates and is fixed on the first through hole of the rubber piece 3, and the bottom surface 42 of the upper connecting bar 4 is welded to one end of the rolled core 5. The insulating rubber piece 3 is sealedly connected to the opening of the housing 7; the cylinder 41 of the upper connecting bar 4 is exposed to the outside and is conductively connected to the negative electrode welding piece 1 through the fixing plate. The lower connecting piece 6 is fixed to the housing 7 by welding; the negative electrode and the positive electrode of the electrochemical energy storage device are led out respectively from the upper connecting bar 4 and the lower connecting piece 6, and the welding pieces 1 of the negative electrode and the positive electrode are led to the outside; the welding pieces 1 of the negative electrode and the positive electrode are respectively welded to the bottom of the housing 7 and to the fixing piece 2, so as to facilitate welding of the product to a circuit board.

Figure 4:
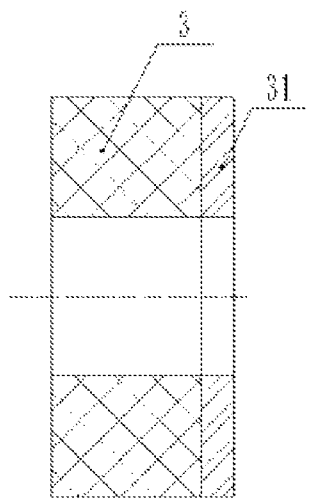
FIG. 4 is a schematic structural diagram of the rubber piece with a bakelite plate of an electrochemical energy storage device of the present invention.

As shown in FIG. 4, in order to improve the strength of the rubber piece 3, a bakelite plate 31 is fixedly connected to one side of the rubber piece 3, and the rubber piece 3 has the same outer diameter as the bakelite plate 31. A second through hole is provided at the center of the bakelite plate 31, which penetrates the plate and corresponds to the first through hole. The first through hole and the second through hole have the same diameter. The addition of the bakelite plate 31 to the rubber piece 3 is to increase the strength of the rubber piece 3 so that it seals better.

Embodiment 2

Figure 8:
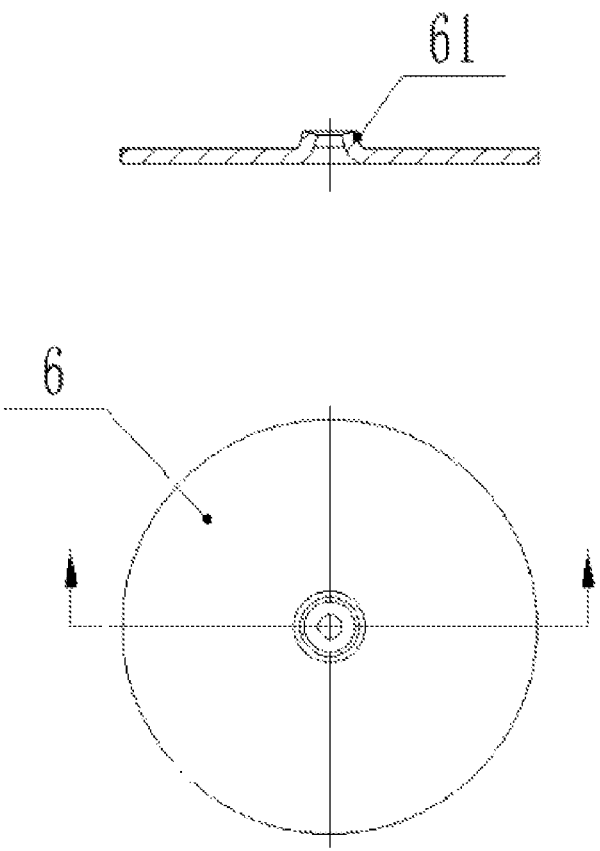
FIG. 8 is a schematic structural diagram of the lower connecting piece of an electrochemical energy storage device of the present invention.

As shown in FIG. 8, this embodiment is a further optimization based on embodiment 1. The improvements of this embodiment compared with embodiment 1 will be the focus of the description, and similarities will not be repeated. In this embodiment, the lower connecting piece 6 is made of aluminum and may be conductively connected to the positive electrode of the rolled core 5 by welding. A positioning hole 61 protrudes from the center of the lower connecting piece 6, and the outer diameter of the positioning hole 61 is smaller than that of the central hole of the rolled core 5, making it possible to place it in the central hole of the rolled core 5 for positioning.

Embodiment 3

Figure 6:
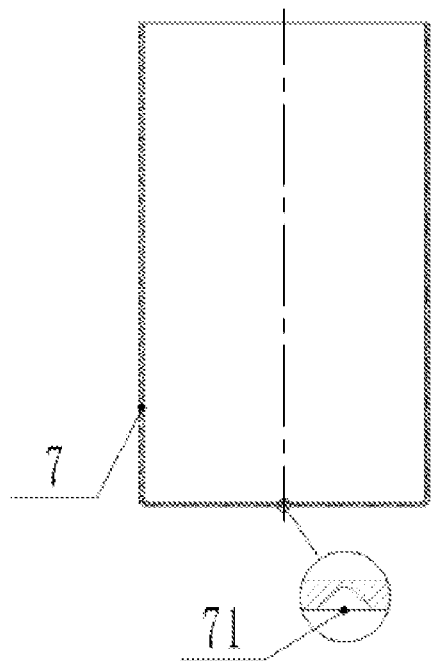
FIG. 6 is a schematic structural diagram of the first anti-explosion valve of an electrochemical energy storage device of the present invention.
Figure 7:
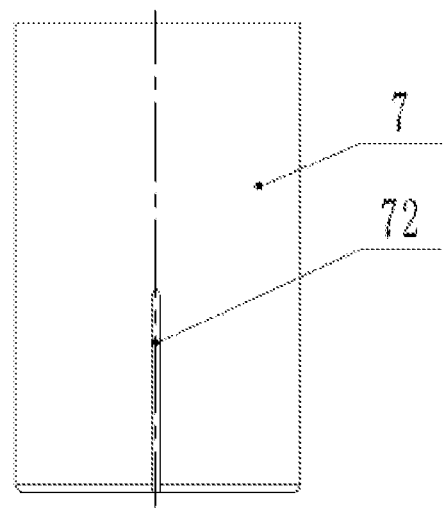
FIG. 7 is a schematic structural diagram of the second anti-explosion valve of an electrochemical energy storage device of the present invention.

As shown in FIGS. 6 and 7, this embodiment is a further optimization based on embodiment 1. The improvements of this embodiment compared with embodiment 1 will be the focus of the description, and similarities will not be repeated. In this embodiment, a first anti-explosion valve is provided at the center of the bottom of the housing 7, and a second anti-explosion valve is provided on the side wall of the housing 7.

Figure 9:
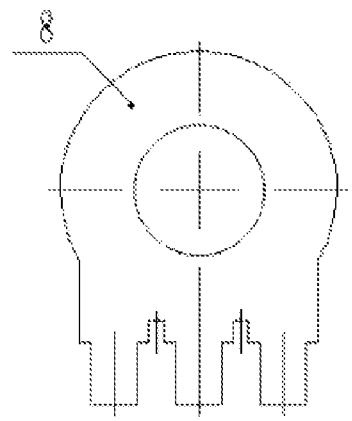
FIG. 9 is a schematic structural diagram of the positive electrode welding piece of an electrochemical energy storage device of the present invention.
Figure 10:
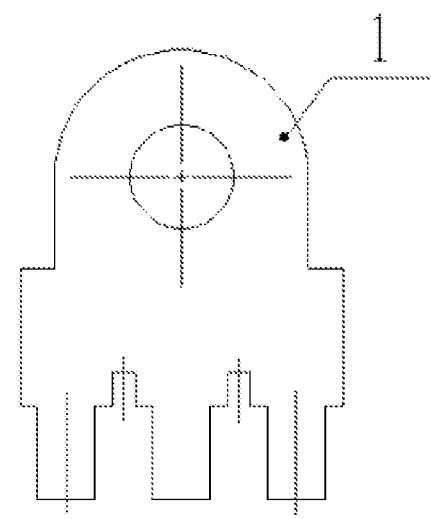
FIG. 10 is a schematic structural diagram of the negative electrode welding piece of an electrochemical energy storage device of the present invention.

The first anti-explosion valve is a first groove formed on the side wall at the end of the housing 7, and the thickness of the first groove is smaller than that of the side wall at the end of the housing 7; the second anti-explosion valve is a second groove formed on the side wall of the housing 7, and the thickness of the second groove is smaller than that of the side wall of the housing 7. As shown in FIGS. 9 and 10, the positive electrode welding piece 8 is provided with a third through hole that penetrates it, and the diameter of the third through hole is greater than the outer diameter of the first anti-explosion valve. This ensures that the anti-explosion valve can be opened normally within the set pressure range.

The above are only the preferred embodiments of the present invention and are not intended to limit the present invention. Any modification, equivalent replacement or improvement made without departing from the motivation and principle of the present invention shall be included in its scope.

The invention claimed is:

1. An electrochemical energy storage device, characterized in that it comprises: an upper connecting bar (4), a rubber piece (3) that has an insulating and sealing effect, a housing (7) and a rolled core (5); wherein the housing (7) is cylindrical and is provided with an opening at at least one end, and the rubber piece (3) and the housing (7) are sealedly connected by means of a waisted section (9) provided on the housing (7); the rolled core (5) is provided in an inner cavity of the housing (7); the upper connecting bar (4) comprising a bottom surface (42) including a cylinder (41) provided on one side of the bottom surface (42) wherein the cylinder (41) penetrates a first through hole of the rubber piece (3) and wherein the rubber piece (3) is sleeved on the cylinder (41) of the upper connecting bar (4) by means of the first through hole and wherein one end of the upper connecting bar (4) is conductively connected to a negative electrode welding piece (1), while the other end of the upper connecting bar (4) is conductively connected to the rolled core (5); the rolled core (5) is conductively connected to the housing (7) by means of a lower connecting piece (6); and a positive electrode welding piece (8) is conductively connected to the housing (7);

wherein a bakelite plate (31) is fixedly connected to one side of the rubber piece (3) and the rubber piece (3) has the same outer diameter as the bakelite plate (31); and a fixing piece (2) is provided between the upper connecting bar (4) and the negative electrode welding piece (1) and the negative electrode welding piece (1) is conductively connected to the fixing piece (2).

2. The electrochemical energy storage device according to claim 1, characterized in that the upper connecting bar (4) is made of aluminum, and wherein the bottom surface (42) is used for welding to the rolled core (5), and further wherein the upper connecting bar (4) comprises a positioning bar (43) provided on the other side of the bottom surface (42) and used for positioning with a central hole of the rolled core (5); the rubber piece (3) is provided with a first through hole, and the rubber piece (3) is sleeved on the cylinder (41) of the upper connecting bar (4) by means of the first through hole; and the diameter of the bottom surface (42) of the upper connecting bar (4) is smaller than the inner diameter of the waisted section (9) of the housing (7).

3. The electrochemical energy storage device according to claim 1, characterized in that a second through hole is provided at a center of the bakelite plate (31), which penetrates the plate and corresponds to the first through hole, and the first through hole and the second through hole have the same diameter.

4. The electrochemical energy storage device according to claim 1, characterized in that a third through hole penetrates the fixing piece (2) at its center, and the cylinder (41) of the upper connecting bar (4) goes through the third through hole and is fixed to the edge of the third through hole by welding.

5. The electrochemical energy storage device according to claim 4, characterized in that the negative electrode welding piece (1) and the positive electrode welding piece (8) are both made of aluminum and plated with nickel or tin.

6. The electrochemical energy storage device according to claim 5, characterized in that the lower connecting piece (6) is made of aluminum and is welded to the rolled core (5), wherein a positioning hole (61) protrudes from a center of the lower connecting piece (6), and the positioning hole (61) is inserted in a central hole of the rolled core (5).

7. The electrochemical energy storage device according to claim 6, characterized in that a first anti-explosion valve is provided at a center of a bottom of the housing (7), and a second anti-explosion valve is provided on a side wall of the housing (7).

8. The electrochemical energy storage device according to claim 7, characterized in that the first anti-explosion valve is a first groove formed at the center of the bottom of the housing (7), and the thickness of the first groove is smaller than that of the side wall at the end of the housing (7); the second anti-explosion valve is a second groove formed on the side wall of the housing (7), and the thickness of the second groove is smaller than that of the side wall of the housing (7).

9. The electrochemical energy storage device according to claim 8, characterized in that the positive electrode welding piece (8) is provided with a fourth through hole that penetrates it, and the diameter of the fourth through hole is greater than the outer diameter of the first anti-explosion valve.

10. The electrochemical energy storage device according to claim 1, characterized in that the rubber piece (3) is made of butyl rubber or ethylene-propylene-diene monomer rubber.

11. An electrochemical energy storage device, characterized in that it comprises: an upper connecting bar (4), a rubber piece (3) that has an insulating and sealing effect and is provided with a first through hole, a housing (7) and a rolled core (5); wherein the housing (7) is cylindrical and is provided with an opening at at least one end, and the rubber piece (3) and the housing (7) are sealedly connected by means of a waisted section (9) provided on the housing (7); the rolled core (5) is provided in an inner cavity of the housing (7); one end of the upper connecting bar (4) penetrates the rubber piece (3) and is conductively connected to a negative electrode welding piece (1), while the other end of the upper connecting bar (4) is conductively connected to the rolled core (5); the rolled core (5) is conductively connected to the housing (7) by means of a lower connecting piece (6); and a positive electrode welding piece (8) is conductively connected to the housing (7); further wherein a first anti-explosion valve is provided at a center of a bottom of the housing (7); characterized in that the positive electrode welding piece (8) is provided with a fourth through hole that penetrates it, and the diameter of the fourth through hole is greater than an outer diameter of the first anti-explosion valve.

\* \* \* \* \*